United States Patent [19]
Armstrong

[11] 4,374,436
[45] Feb. 15, 1983

[54] SYSTEM FOR THE MONITORING AND RESTORATION OF SERIES TERMINALS IN A LOOPED COMMUNICATION SYSTEM

[75] Inventor: Thomas R. Armstrong, Largo, Fla.

[73] Assignee: Paradyne Corporation, Largo, Fla.

[21] Appl. No.: 198,234

[22] Filed: Oct. 17, 1980

[51] Int. Cl.³ .............................................. G06F 11/20
[52] U.S. Cl. ........................................ 371/11; 370/16; 364/900
[58] Field of Search ................. 361/11, 8; 370/16, 14; 364/200, 900

[56] References Cited

U.S. PATENT DOCUMENTS

| 4,015,241 | 3/1977 | Takezoe | 370/16 |
| 4,048,446 | 9/1977 | Hafner et al. | 370/16 |
| 4,112,414 | 9/1978 | Iscol et al. | 371/22 |
| 4,124,887 | 11/1978 | Johnson et al. | 371/11 |
| 4,190,821 | 2/1980 | Woodward | 370/16 |
| 4,245,343 | 1/1981 | Frey | 371/11 |
| 4,273,955 | 6/1981 | Armstrong | 178/69 G |

Primary Examiner—Charles E. Atkinson
Attorney, Agent, or Firm—Kane, Dalsimer, Kane, Sullivan and Kurucz

[57] ABSTRACT

A loop architecture modification is provided along with a monitoring and control device for unidirectional loop architecture such that failed terminals or loop interconnections may be detected and such that corrective actions may be automatically or manually taken to restore operation to the remaining terminals in the loop.

5 Claims, 9 Drawing Figures

|  | SYNC CODE OBSERVED | |
|---|---|---|
| DATA ACTIVITY | YES | NO |
| YES | TERMINAL LOOP N + 1 IS OK | STREAMING TERMINAL ON LOOP N + 1 |
| NO | NOW ALLOWED EVENT | INOPERATIVE TERMINAL OR OPEN CIRCUIT ON LOOP N + 1 |

FIG.9

SYSTEM FOR THE MONITORING AND RESTORATION OF SERIES TERMINALS IN A LOOPED COMMUNICATION SYSTEM

BACKGROUND OF THE INVENTION

The present invention relates to looped or unidirectional, series data communication networks and in particular to a device which permits the detection of and restoration due to faults in such networks.

In my pending, commonly assigned patent application, SYSTEM FOR IN-SERVICE QUANTATIVE PERFORMANCE ANALYSIS OF DATA COMMUNICATIONS SYSTEM, Ser. No. 17,041, now U.S. Pat. No. 4,273,955 there is disclosed a technique for the monitoring and restoration or reconfiguration of elements of a multiple location data communications system. The monitoring, restoration and reconfiguration may relate to local or remote sites and is accomplished from a central location. The communication systems addressed in this patent application, Ser. No. 17,041 are classified as point-to-point or multipoint in architecture.

While this pending case solves a majority of the problems heretofore encountered, it does not specifically address the monitoring and restoration of data communication which employ looped or unidirectional series architecture.

In view of the above, it is the principal object of the present invention to provide a device or method whereby the components of a looped communication system may be monitored from a central site.

A further object is to provide such a system wherein the looped communication system may be restored from a central site given a failure of an element in the loop.

Still further objects and advantages will be apparent from a review of the detailed description of the preferred embodiment of my invention.

SUMMARY OF THE INVENTION

The above and other beneficial objects and advantages are attained in accordance with the present invention by providing a local loop adapter (LLA). The LLA is located at each site in a looped communication system which contains one or more terminals or devices which are attached to the loop. The loop communication system architecture is then changed from a loop which connects the terminals to a star configuration wherein each terminal is connected directly to the LLA.

The LLA performs two functions. Firstly, the LLA monitors the data from each terminal to which it is connected to assess the performance of the terminal and its connection to and from the LLA. Failed communication system elements may be readily detected. Secondly, the LLA restores the loop to operation given a terminal or connection failure by bypassing the loop signal to and from the failed terminal.

BRIEF DESCRIPTION OF THE DRAWINGS

In the accompanying drawings:

FIG. 9 is a table of diagnostic messages which may be deduced from characteristics of the data stream between terminals.

DETAILED DESCRIPTION OF THE PREFERRED EMBODIMENTS

Figure 1:
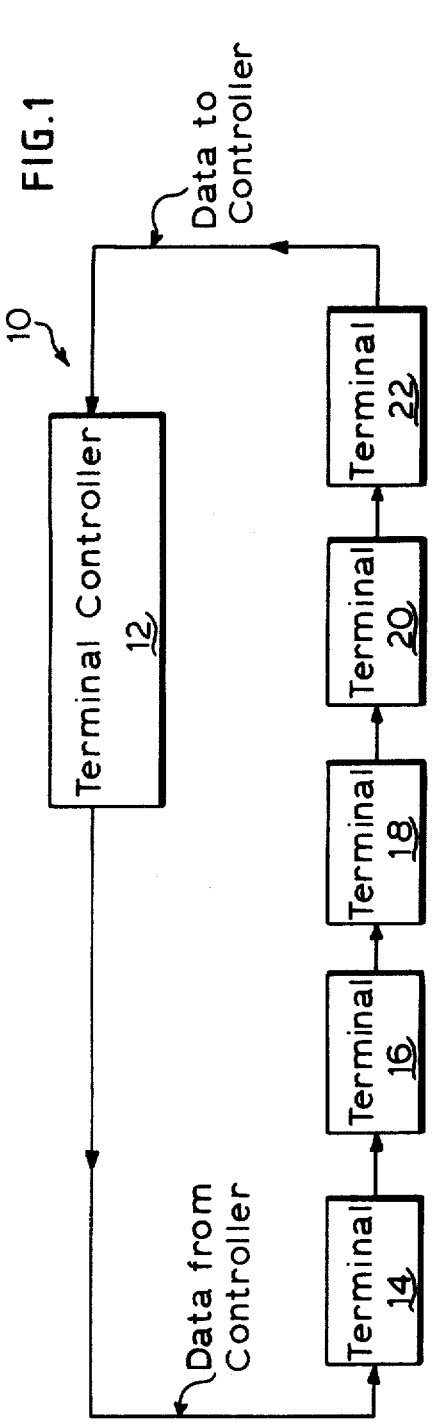
FIG. 1 is a diagram of a simple loop communications system employing a controller and several terminals.

Reference is now made to the drawings and to FIG. 1 in particular wherein a loop architecture data communications system 10 is depicted. The system shown is composed of a terminal controller 12, typically an IBM Model 3601 and five series connected terminals 14, 16, 18, 20 and 22 such as IBM Modem 3604, 3611, or 3612s. The terminal controller 12 and terminals 14, 16, 18, 20 and 22 are well known to those skilled in the art and are discussed in references such as *IBM 3600 Finance Communication System Summary* published by International Business Machine Corp., Charlotte, N.C. 28234. The terminals are series connected by means of a two wire connection. Electrically, the loop signal may be described as balanced, bipolar. The signal's characteristics are described in detail in *IBM Finance Communication System Logo Interface* published by IBM at the above address.

A key concept of the architecture of FIG. 1 is that each of terminals 14, 16, 18, 20 and 22 receives the signal as outputted by the terminal before it and serves to regenerate the signal before sending it along the loop to the next down stream terminal. Hence, if a loop were open circuited or if a terminal failed to regenerate the signal properly, either electrically or digitally, the entire loop would be rendered inoperative.

Figure 2:
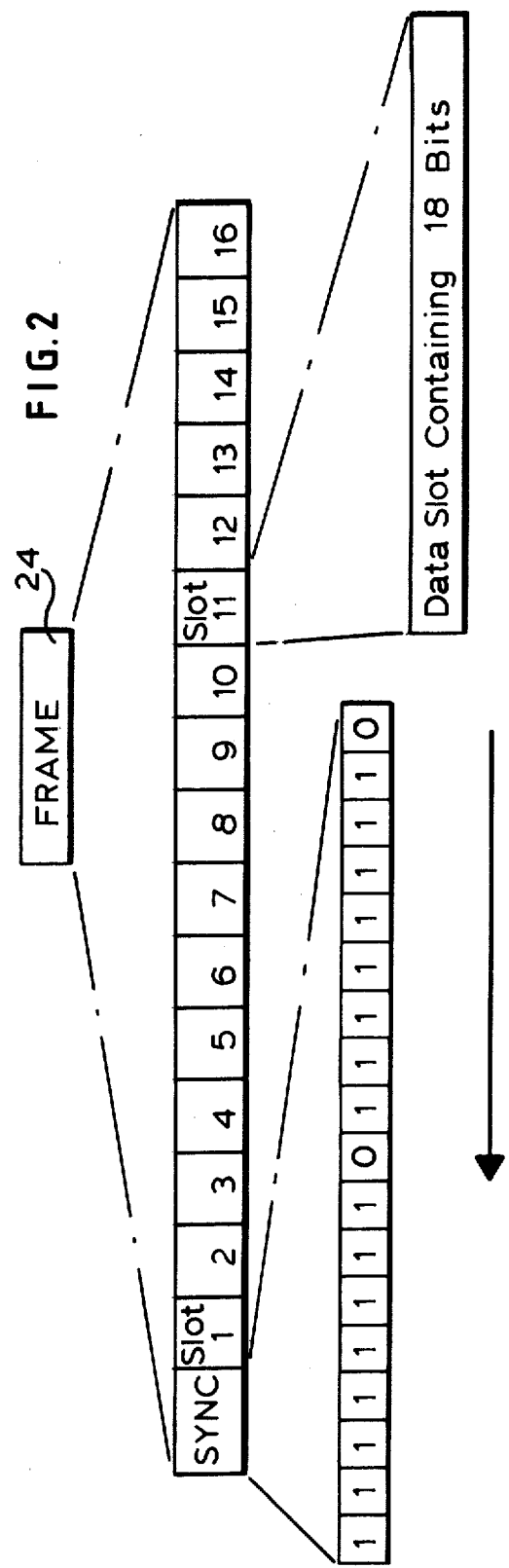
FIG. 2 is a diagram presenting a data format as commonly used on IBM 3600 type loops.

An electrical regeneration failure means that the terminal does not generate the proper voltage levels at its output. A digital regeneration error may be due to one of two causes as may be observed from FIG. 2 which illustrates the 3600 loop data format. Data on this loop consists of contiguous frames, each frame 24 being composed of 306 bits. Slot zero is for synchronization and is defined to be composed of 1111111101111111110. Slots one through sixteen each contain 18 data bits. A particular terminal's address, set upon installation, enables it to utilize one or more known slots to receive and to transmit data. Each terminal must therefore process all bits within a frame. When the terminal's assigned slot is received the terminal reads data from the slot and may write data into the slot. Slots assigned to other terminals are regenerated and passed through unaltered.

A digital regeneration failure may be one of two types: The terminal may write into non-allowed frames, thereby destroying data to or from other terminals on the loop. The terminal may also not output any data, thereby destroying data to or from other terminals on the loop.

Figure 3:
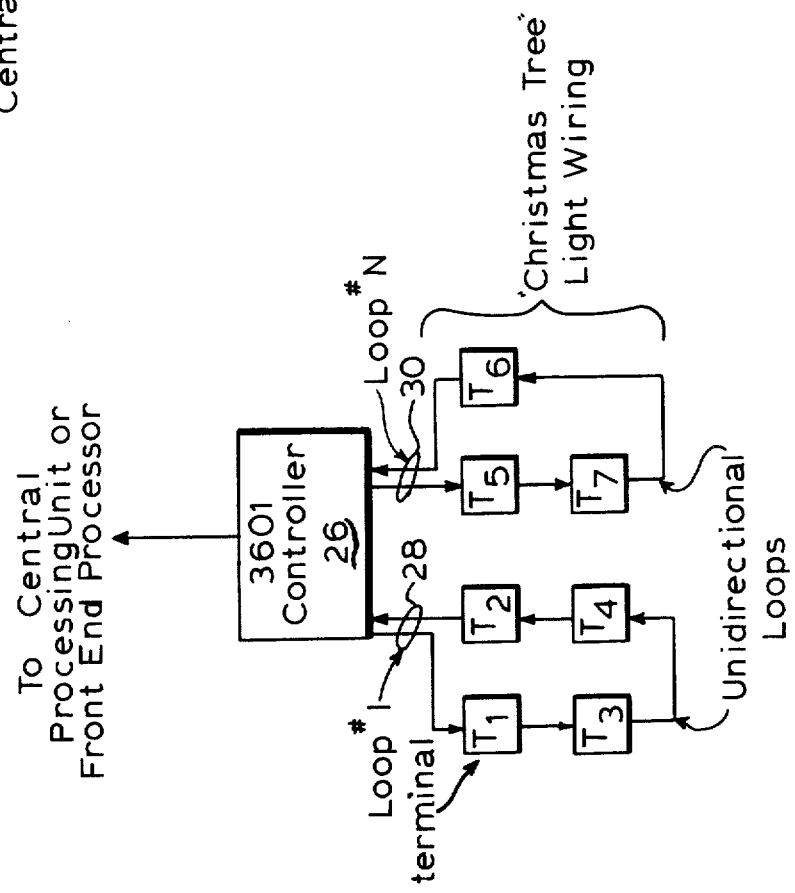
FIG. 3 is a diagram of a typical loop communication system as currently available.

FIG. 3 illustrates a loop controller 26 and two attached loops 28 and 30. Heretofore each terminal on a particular loop was wired directly to the terminal directly preceding it and to the terminal directly succeeding it. Again, failure of any terminal on a loop causes loss of data to and from all terminals on that particular loop.

Figure 4:
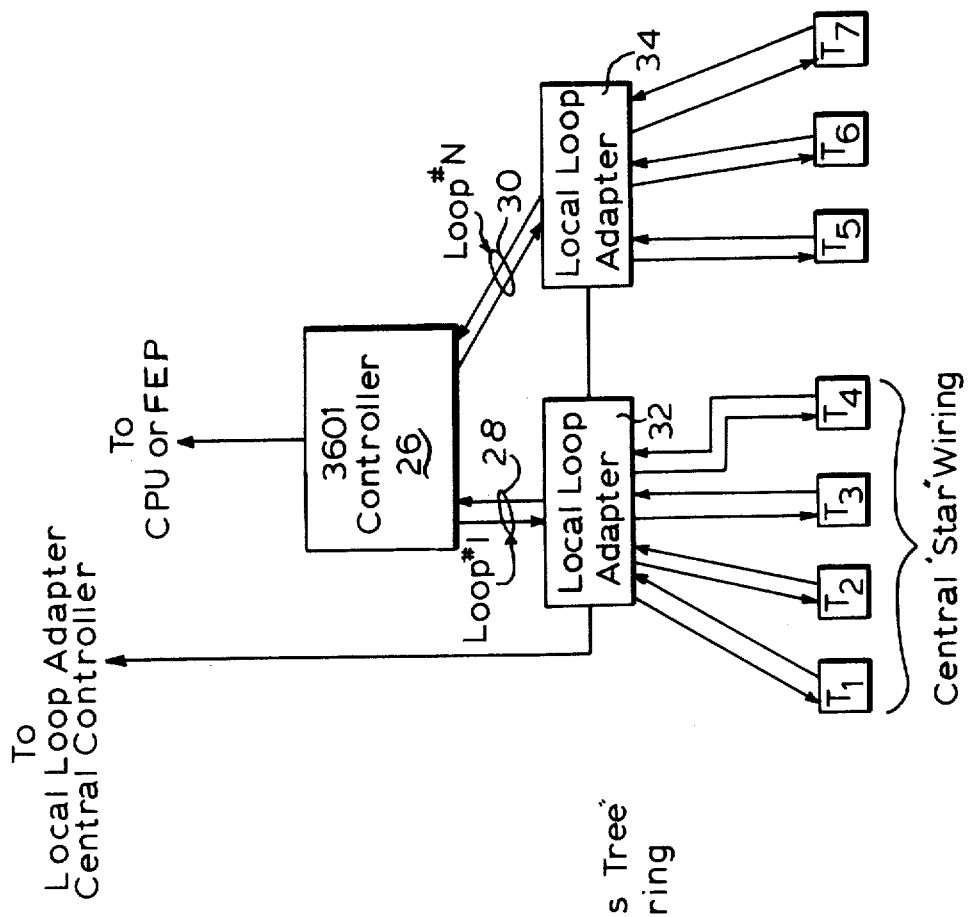
FIG. 4 is a diagram of a loop communication system similar to FIG. 3 but with the local loop adapter device of the present invention utilized.

FIG. 4 illustrates the system of FIG. 3 into which the local loop adapter device of the present invention has been incorporated. Each port or loop connection of a particular loop is connected to a local loop adapter (i.e., adapter 32 for loop 28 and adapter 34 for loop 30). The terminals corresponding to each particular controller loop port are connected to the appropriate LLA in a star-like manner. Thus terminals $T_1$, $T_2$, $T_3$, and $T_4$ are connected to adapter 32 and terminals $T_5$, $T_6$ and $T_7$ are connected to adapter 34. Electrically and digitally, the loop signals are unaltered by the LLA 32 and 34 as are the physical locations of the controller 26 and terminals. The only change required to incorporate the LLA is the physical layout of the loop interconnect wiring. The LLAs are connected to a central control unit by means of a 110 bps telemetry channel as described in my patent application Ser. No. 17,041. Tandem connection of multiple LLA control channels is possible via combining logic discussed below.

Figure 5:
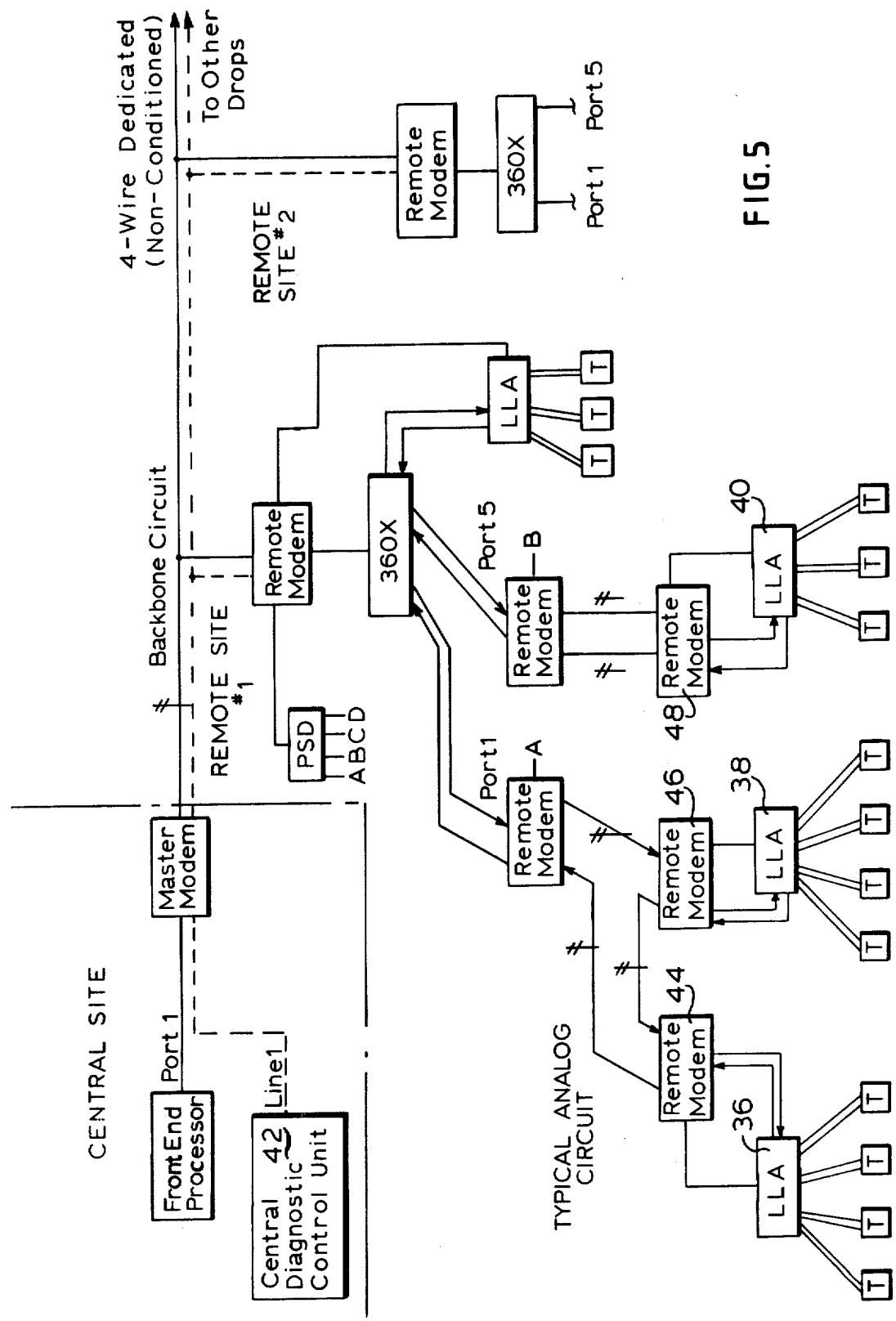
FIG. 5 is a diagram of a modified loop communication system utilizing the LLA of the present invention wherein not all loops are local to the loop controller.

FIG. 5 depicts a system in which terminal loops are at sites remote from the loop controller and in which the loops are connected to the controller by means of telephone channel modems. LLAs may be utilized at these sites in a manner similar to their use at controller sites as discussed above. Here each remote LLA 36, 38, 40 must share its corresponding modems diagnostic channel to the central diagnostic control unit 42. Specifically, each modem 44, 46 and 48 and each LLA 36, 38 and 40 appears as an address to the diagnostic controller 42 and each modem and LLA communicates with the diagnostic controller on the 110 bps telemetry side channel as discussed in the aforementioned patent application.

Figure 6:
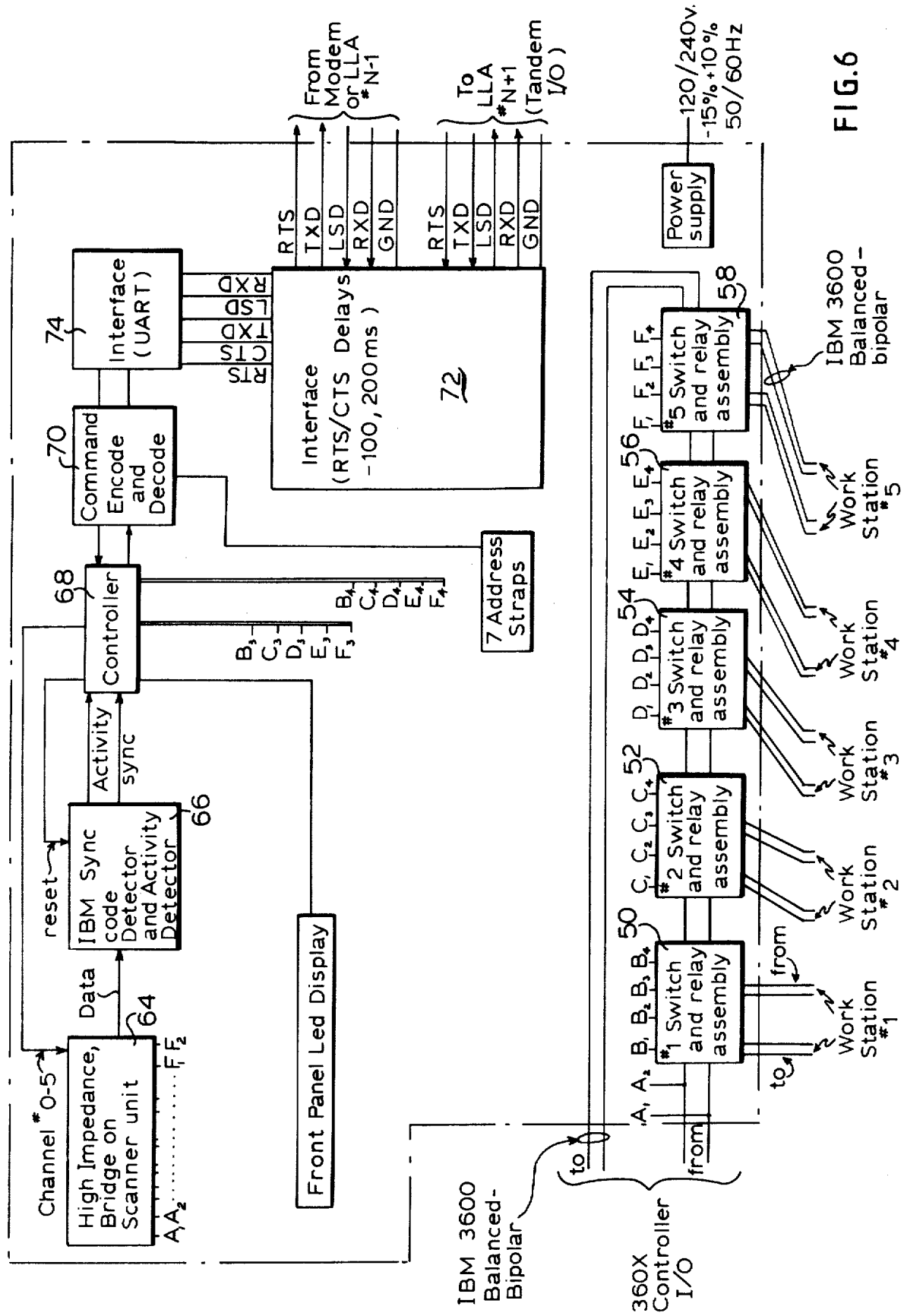
FIG. 6 is a detailed functional diagram of the local loop adapter device.

A functional diagram of one particular implementation of the local loop adapter of the present invention is given in FIG. 6. The controller output which normally is attached to the first terminal on the loop (i.e., terminal 14 of FIG. 1) is attached to Switch and Relay Assembly 50. The input to the controller normally connected to the last terminal on the loop (i.e., terminal 22 of FIG. 1) is connected to the output of Switch and Relay Assembly 58. In subsequent use a work station is defined as a collection, usually two, of terminals which perform a function; for example, a keyboard and passbook printer. The first terminal or work station receives its input from and supplies its output to Switch and Relay Assembly 50. Other terminals and work stations are attached to Switch and Relay Assemblies 52, 54, 56 and 58 as shown. If the number of work stations is less than five, the Switch and Relay Assemblies directly bypass or pass through the IBM, analog, loop signal.

Figure 7:
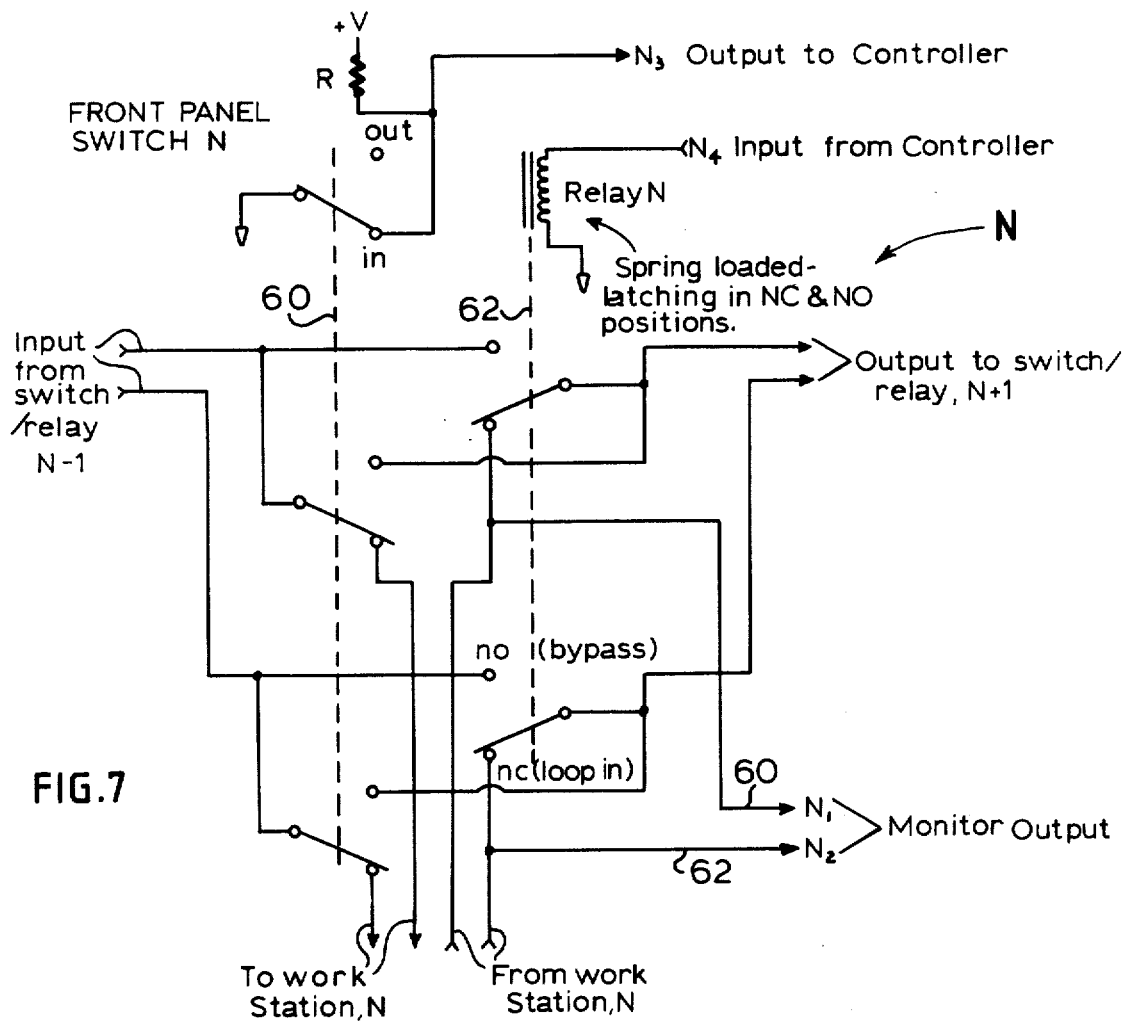
FIG. 7 is a schematic diagram of the switch relay assembly employed in the local loop adapter device.

A detailed schematic diagram of the Switch and Relay Assemblies 50, 52, 54, 56 and 58 is given in FIG. 7 wherein a representative assembly "N" is depicted. The assembly 50 consists of a 3 pole, double throw switch 60 and a double pole relay 62. Beginning with the operation of the 3PDT switch 60, if the switch is in the OUT position, signals from assembly number N-1 are fed directly to assembly number N and the output to and input from work station N are not used. This is the situation when no work station is to be connected to assembly N. If the switch is IN, the output from assembly N-1 is supplied to work station N and the output from work station N is supplied to assembly N+1. This is the normal mode in which work stations are attached to the LLA. The third pole of the switch controls a voltage to the controller subsystem. If the voltage equals +V, the switch is OUT and no work stations are connected to assembly N. If the voltage equals 0, a work station is connected to assembly N.

The information as to whether or not a work station or terminal is connected to a particular assembly is used by the controller in determining the existence of fault conditions. The diagnostic messages are set forth in FIG. 9.

A two pole, double throw, latching relay 62 is controlled by the controller subsystem. In the normally closed position, the work station connected to assembly N is electrically in series with the stations which are connected to assemblies N−1 and N+1.

If a failure condition is detected in that portion of the loop which is connected to assembly N, placing the relay in the normally open position causes that portion of the loop which is connected to assembly N to be bypassed. The bypass of the failed loop segment restores normal operation to the remaining terminals connected to the LLA. The relay is latching in both the NO and NC positions so that a power failure to the LLA will not cause a change in the relay position or configuration of the LLA.

Each switch relay assembly provides two monitor outputs 60 and 62 to the scanner subsystem. In conjunction with the monitor points $A_1$ and $A_2$ (shown in FIG. 6) the scanner may access the returned signal from each work station or terminal group as well as the loop signal outputted by the loop controller.

The high impedance, bridge-on scanner unit 64 consists of a high input impedance, balanced receiver whose input is alternately switched between the input points $A_1$ and $A_2$, $B_1$ and $B_2$, $C_1$ and $C_2$, $D_1$ and $D_2$, $E_1$ and $E_2$ and $F_1$ and $F_2$. Switching is accomplished by means of FETs and the hardware implementation is straight forward. A more detailed discussion of such a circuit may be found in *Operational Amplifiers Design and Applications*, Edited by Geraeme, Tobey and Huelsman, McGraw Hill Book Company, copyright by Burr-Brown Research Corporation, 1971.

The scanner circuit samples each input signal for a period of 2 seconds, during which time the digital data appearing on the loop at the sampled point is input to the IBM sync code and activity detector subsystem 66.

The sync code and activity detector subsystem operates as follows. After the scanner has been attached to a particular channel by the controller, the controller sends a reset pulse to the detector subsystem. The detector subsystem then begins to examine the incoming data for the presence of activity, that is 0 to 1 and 1 to 0 transitions. If activity is present, this fact is conveyed to the controller subsystem. A search of the incoming data stream for the presence of the sync code pattern 1111111101111111110 is also made. If this specific pattern is observed to occur once in every sequence of 306 bits, a "sync found" indication is sent to the controller subsystem. Each time a reset pulse is received by the sync code and activity detector, a new search for data activity and the presence of the prioer sync pattern in the data is made.

If data activity and a sync code are observed when the data from work station #N are observed, then when the data from work station #N+1 is scanned, the diagnostic messages or conclusions shown in FIG. 7 are possible. Data and sync present means that all terminals or work stations on loop #N+1 are operating normally and the loop is electrically intact. Data and no sync code means that a terminal is in the streaming or "babble" mode and is outputting meaningless data. No data and no sync means that the loop is an open circuit or that a terminal on the loop is inoperative. The last combination of detecting sync when data activity does not occur is not possible.

All sequencing and control functions of the LLA are performed by the controller subsystem 68. The controller 68 may be implemented by dedicated logic composed of 7400 series TTL logic components or may be implemented by a microprocessor such as the Motorola 6800 or Texas Instruments TI 9940.

One function of the controller is to switch the scanner subsystem input between channel inputs 0 through 5. Once the scanner is placed on a new channel, a reset pulse is supplied to the sync code and activity detector. The controller then monitors the detector output for data activity and sync on that specific channel. Data and sync conditions for each input channel are stored in this controller.

As previously discussed, the controller also monitors the state of the front panel switch outputs $B_4$, $C_4$, $D_4$, $E_4$ and $F_4$ in order to determine if a particular relay assembly should normally be placed in the terminal bypass or the terminal non-bypass state depending upon whether or not a terminal or work station is attached to the particular switch and relay assembly.

The synchronization and data activity states of the six loops signals entering the LLA (indicated by FROM) are stored in the controller as these conditions must be available when the controller is queried by the command encode and decode subsystem.

The controller may also open and close the latching relays in the switch and relay assembly by means of the signal paths denoted by $B_3$, $C_3$, $D_3$, $E_3$ and $F_3$.

The controller 68 may be implemented by conventional TTL logic or the functions may be performed by a microprocessor such as the Intel 8080, Motorola 6800 or Texas Instruments 9940.

The command encode and decode subsystem 70 decodes interrogations from a central control unit and responds with a reply containing the status (synchronization and activity) of the six monitored loop signals. The basic interrogation and protocol format is explained in my pending patent application, Ser. No. 17,041.

A basic interrogation command from the central controller to the appropriately addressed LLA causes the LLA to respond with a message of this form:

$$000A_1A_2A_3A_4A_5P1$$

$$0A_6A_711FFFP1$$

if no alarm conditions are present, that is, all active loop signals have synchronization and data present. In the above two byte response, 0 denotes start bit, $A_k$ are the even address bits, P is a parity check, an F denotes a format indicator bit.

If an alarm condition is present, the LLA response is as above followed by $$0S_1D_1S_2D_2S_3D_31P1$$

$$0S_4D_4S_5D_5S_6D_61P1$$

$$0R_1R_2R_3R_4R_511P1$$

where $S_k=1$ indicates a sync alarm on channel K and $D_k=1$ indicates a loss of data on channel K. 0 values for these variables indicate non-alarm conditions of the related channel. The final message byte contains six $R_k$s where $R_k=1$ indicates that the respective switch and relay assembly is active or, equivalently, is connected to a work station or terminal.

The LLA may also accept commands as opposed to inquiries. Command formats are explained in my pending application Ser. No. 17,041. The third byte of a command is of the format $$0C_1C_2C_3C_4C_511P1$$

Here $C_k=1$ indicates the respective switch and relay assembly should be placed in the bypass state and $C_k=0$ causes the relay to be placed in the non-bypass state. The LLA response to a command is an echo of the command received.

The command encode and decode functions may be implemented by standard TTL logic or these functions may be accomplished by a microprocessor if a microprocessor implementation is chosen for the controller subsystem.

Figure 8:
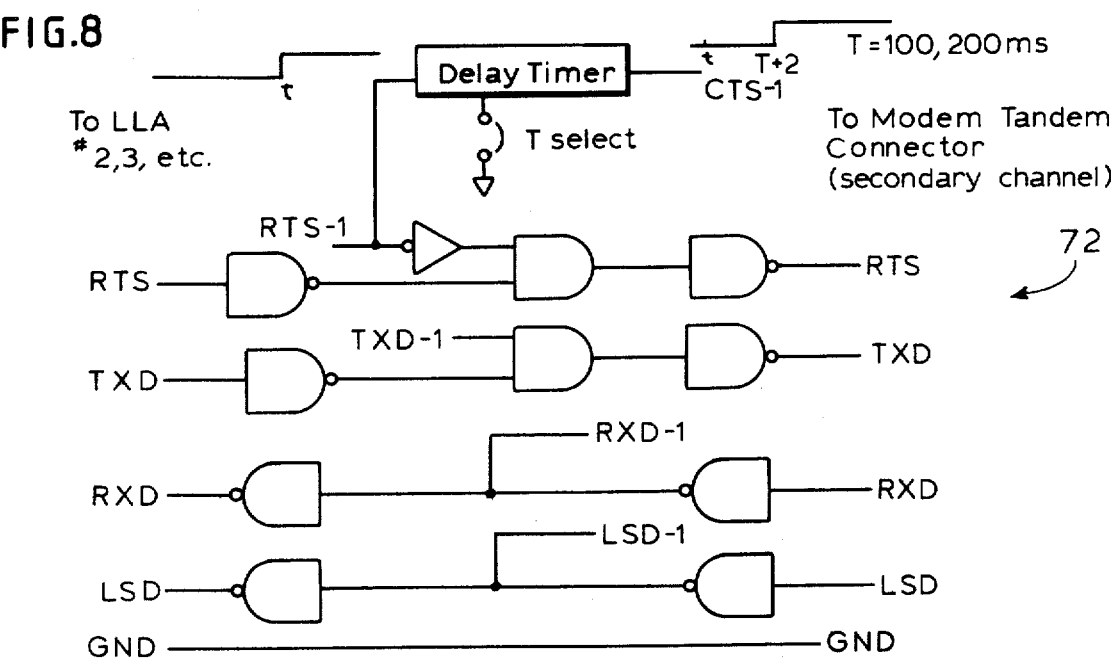
FIG. 8 is a schematic diagram of the logic which permits tandem connection of the local loop adapter devices as connected to a central control unit.

Commands and responses to and from the LLA pass through the Interface Subsystem 72 which is depicted in detail in FIG. 8. The input/output is EIA standard RS232. As depicted in FIG. 8, the Interface Subsystem 72 passes required signals to and from a universal assynchronous receiver transmitter UART 74 and allows for tandem connection of multiple LLAs through the live connections marked with reference to FIG. 6. Thus, in accordance with the above, the aforementioned objectives are effectively attained.

Having thus described my invention, what I claim is:

1. A local loop adapter system for selectively disconnecting a terminal from a loop of interconnecting terminals, comprising:
   a controller and
   a plurality of switch assemblies each having incoming connecting means, on which data is received from a first terminal;
   terminal connecting means on which data is sent to and received from a second terminal;
   outgoing connecting means on which data is sent to a third terminal switching means which on command from the controller allows either data from said incoming connecting means to go to said second terminal, and allows data from said second terminal to go to said outgoing connecting means, or
   allows data from said incoming connecting means to go directly to said outgoing connecting means, ignoring all data receiving from said second terminals; and
   control means provided to operate the switching means on command from said controller.

2. The system of claim 1 wherein said switching assembly further comprises monitoring means connected to said terminal connecting means and provided to enable the controller to monitor the data sent by said second terminal.

3. The system of claim 1 wherein said switching means comprise a relay which is controlled by said controller which is adapted to disconnect said second terminal.

4. The system of claim 3 wherein the switching means comprise a three pole double throw switch which is also adapted to disconnect said second terminal.

5. The system of claim 4 wherein said switch has an OUT position whereby the terminal is disconnected and IN position whereby the terminal is on line, said switch being adapted to override said relay in the OUT position.

* * * * *